Jan. 13, 1925.
J. F. O'CONNOR
1,522,645
FRICTION SHOCK ABSORBING MECHANISM
Original Filed Nov. 8, 1922   2 Sheets-Sheet 1
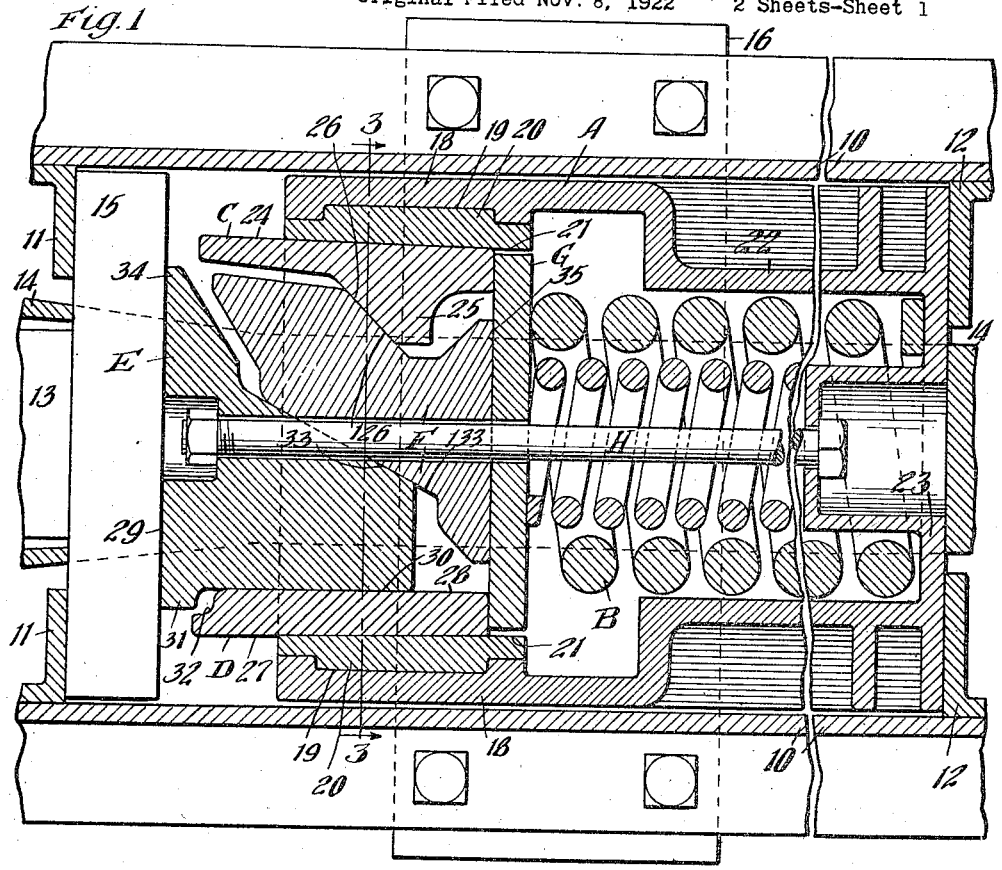
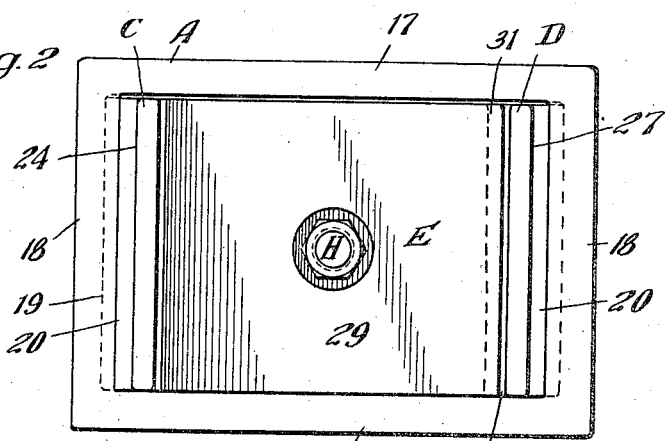
Witnesses
Wm. Geiger
Inventor
John F. O'Connor
By Geo. J. Haight
his Atty.

Jan. 13, 1925.  1,522,645
J. F. O'CONNOR
FRICTION SHOCK ABSORBING MECHANISM
Original Filed Nov. 8, 1922   2 Sheets-Sheet 2
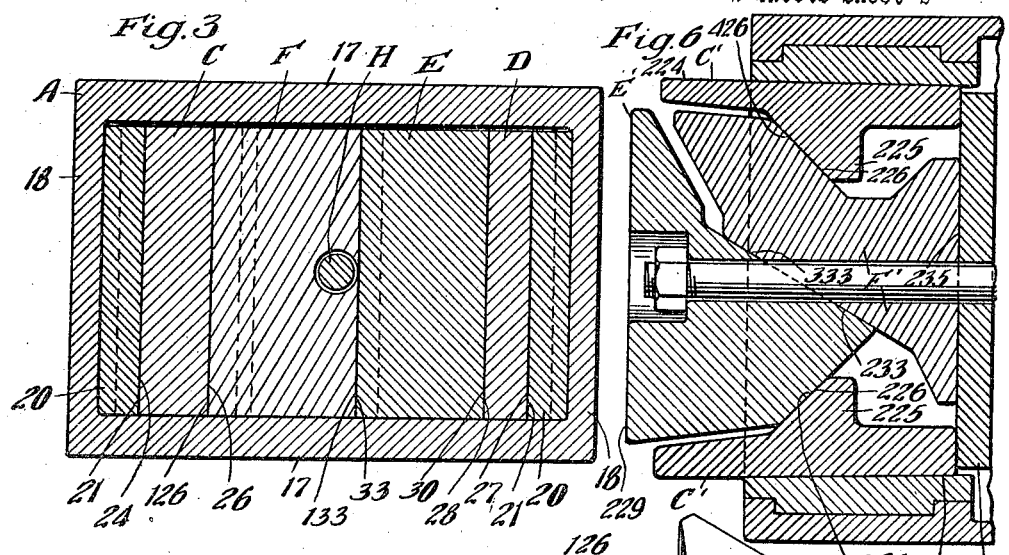
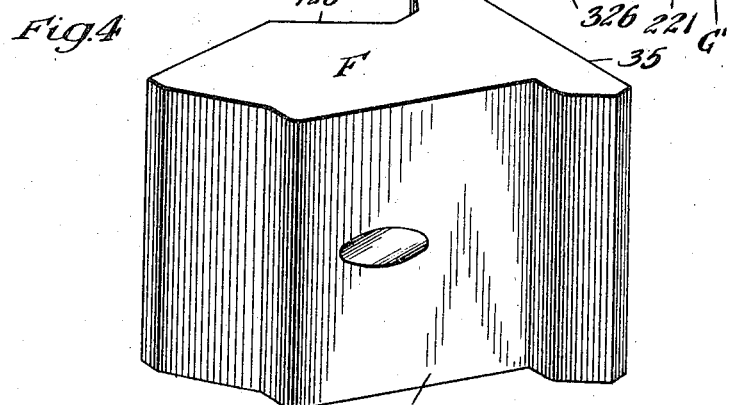
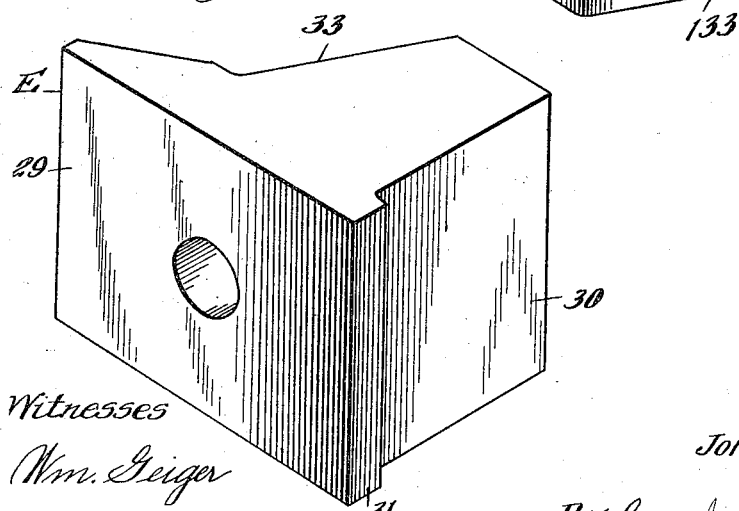
Inventor
John F. O'Connor
By Geo. J. Haight his Atty.

Patented Jan. 13, 1925.

1,522,645

UNITED STATES PATENT OFFICE.

JOHN F. O'CONNOR, OF CHICAGO, ILLINOIS, ASSIGNOR, BY MESNE ASSIGNMENTS, TO W. H. MINER, INC., A CORPORATION OF DELAWARE.

FRICTION SHOCK-ABSORBING MECHANISM.

Application filed November 8, 1922. Serial No. 599,623. Renewed June 7, 1924.

*To all whom it may concern:*

Be it known that I, JOHN F. O'CONNOR, a citizen of the United States, residing at Chicago, in the county of Cook and State of Illinois, have invented a certain new and useful Improvement in Friction Shock-Absorbing Mechanisms, of which the following is a full, clear, concise, and exact description, reference being had to the accompanying drawings, forming a part of this specification.

This invention relates to improvements in friction shock absorbing mechanisms.

One object of the invention is to provide a friction shock absorbing mechanism especially adapted for railway draft riggings wherein is obtained high capacity combined with certain release, the spreading means being so designed as to produce the effect of a keen angle wedging system during compression and a blunt angle wedging effect in release.

A more specific object of the invention is to provide a mechanism of the character indicated wherein is employed a system of shoes and wedge elements to arranged as to utilize one set of cooperating faces to effect the spreading action during a compression stroke and other cooperating faces, arranged at a blunt angle with respect to the axis of the mechanism and applied forces, to insure release or collapse of the system.

Other objects of the invention will more clearly appear from the description hereinafter following.

In the drawings forming a part of this specification, Figure 1 is a horizontal sectional view of a portion of a railway draft rigging showing my improvements in connection therewith. Figure 2 is a front end elevation of the shock absorbing mechanism proper. Figure 3 is a vertical transverse sectional view of the shock absorbing mechanism proper, taken on the line 3—3 of Figure 1. Figures 4 and 5 are detail perspectives of the two wedge elements employed in the construction, shown in Figures 1, and 3. And Figure 6 is a broken sectional view similar to Figure 1, illustrating another embodiment of the invention.

In said drawings and referring to the arrangement shown in Figures 1 to 5, inclusive, 10—10 denote channel draft sills of a car underframe, to the inner faces of which are secured front stop lugs 11 and rear stop lugs 12. A portion of a drawbar is indicated at 13, the same being operatively associated with the shock absorbing mechanism proper by a hooded cast yoke 14 within which is disposed the shock absorbing mechanism and a front follower 15. The yoke and parts therewithin are supported in operative position by a detachable saddle plate 16.

The improved shock absorbing mechanism proper, as shown, comprises a combined friction shell and spring cage casting A; a spring resistance B; two friction shoes C and D; two wedge elements E and F; a spring follower G; and a retainer bolt H.

The casting A is of rectangular cross section at its outer end where the same is provided with top and bottom parallel walls 17—17 and side walls 18—18. The latter, on their inner faces, are recessed as indicated at 19—19 to receive detachable liner blocks 20 of special wear-resisting metal, said blocks 20 having their inner faces 21 flat and converged inwardly of the casting A to provide shell friction surfaces. Rearwardly of the shell proper of the casting A, just described, the casting is necked inwardly as indicated at 22 to form the spring cage or casing proper to house and center the spring B. At its rear end, the casting A is provided with an integral vertical wall 23 laterally extended and suitably reinforced to adapt it to act as the rear follower of the mechanism.

The friction shoe C is formed on its outer side with a flat friction surface 24 cooperable with the corresponding adjacent shell friction surface 21. On its inner side, the shoe C has an inwardly extending enlargement 25, the latter having an inclined face 26 formed thereon which slopes toward the axis of the mechanism and toward the rear of the casting. Said face 26 is inclined to the axis at a blunt angle for the purpose hereinafter described.

The other shoe D, as best shown in Figure 1, is in the form of a relatively thick flat plate having an outer friction surface 27 cooperable with the corresponding adjacent shell friction surface 21 and an inner flat face 28.

The outer pressure-receiving and transmitting wedge element E is in the form of a relatively heavy block having an outer flat face 29 against which bears the follower 15. On the side adjacent the shoe D, the wedge element E has a flat face 30 engaging the face 28 of the shoe D. The element E is shouldered as indicated at 31 and the shoe D is correspondingly notched as indicated at 32 so that, normally, there is a small clearance between the shoulder 31 and the shoe D, as clearly shown in Figure 1. On the side opposite to the face 30, the element E is provided with a wedge face 33 which extends at a relatively acute angle with respect to the axis of the mechanism and forces applied parallel or substantially parallel thereto. Preferably, the element E is laterally extended as indicated at 34 outwardly of the wedge face 33 so as to obtain a wider bearing with the follower 15.

The other wedge element F is in the form of a block having on its outer side an inclined face 126 corresponding in inclination to and cooperable with the blunt angle face 26 of the shoe C. On its opposite side, the element F is provided with a wedge face 133 extending at the same angle as and cooperable with the wedge face 33 of the element E. At its inner end, the element F is provided with a transverse face 35 normally bearing upon the spring follower G. The latter also normally bears upon the inner ends of the shoes C and D, as shown in Figure 1.

The spring B, preferably consisting of inner and outer coils, bears at its front end upon the follower G and at its rear end upon suitable portions of the casting A so as to thereby provide a yielding resistance for relative movement between the friction shell and the friction-creating elements.

The retainer bolt H is anchored at its rear end within a suitable hollow boss in the casting A and at its forward end within a recess provided in the element E, the latter, the element F and the follower G being all suitably recessed to accommodate the shank of the bolt.

Referring to the construction shown in Figure 6, the arrangement of friction shell, spring and spring follower, is the same as that shown in Figure 1. In the arrangement of Figure 6, two like shoes are employed, C'—C', each having an outer friction surface 224 cooperable with the corresponding adjacent friction shell surface 221. Each shoe C is also provided with a lateral enlargement 225, the latter each having inclined faces 226 extending rearwardly of the mechanism and at a blunt angle with respect to the axis thereof.

Two wedge elements E' and F' are employed, the former having an outer flat bearing face 229 adapted to be engaged by the follower, and an inclined keen angle wedging face 233, the latter passing across the axis of the mechanism as in the case of the two wedge faces 33 and 133 shown in Figure 1. The element E' is further provided with an inclined face 326 cooperable with the corresponding face 226 of the adjacent shoe C'. The element F' has a wedge face 333 cooperable with the wedge face 233 of the other element E'. The element F' is further provided with an inclined face 426 cooperable with the inclined face 226 of the corresponding adjacent shoe C'. At its inner end, the element F' has a flat bearing face 235 adapted to engage the spring follower G'.

The operation of the mechanism shown in Figures 1 to 5 inclusive, assuming a buffing compression stroke, is as follows. As pressure is transmitted from the follower 15 to the element E, a keen angle wedging effect is set up between the elements E and F on the cooperating faces 33 and 133. During the initial movement of the element E, there will be a tendency for the latter to advance with respect to the shoe D, and should the friction between the latter and the friction shell be greater than that between the shoe D and the element E, the latter will ultimately engage the outer end of the shoe D and insure inward movement of the latter during the balance of the compression stroke. Due to the blunt angle at which the engaging faces 26 and 126 extend with respect to the axis of the mechanism and the direction of the applied forces, there will be no effective or appreciable wedging action thereon, that is to say, there will be no appreciable relative slippage of the two faces 26 and 126. Obviously, however, the lateral resistance to the spreading action of the two elements E and F will be equalized on the two shoes C and D so that high pressure will be created between the shoes C and D and the friction shell. After the friction elements have been expanded as above described, continued inward movement with respect to the shell will be yieldingly resisted by the spring B and a great amount of friction generated, due to the keen angle wedging effect produced by the faces 33 and 133.

Upon discontinuance of the actuating force, it will be observed that collapse of the friction system is insured by reason of the blunt angle faces 26 and 126 since the included angle between the face 26 and the friction shell surface 21 on the opposite side of the shell is extremely blunt and of true releasing character so that the three elements D, E and F, considered as a unit, are free to be projected outwardly, assuming that the shoe C is in tight frictional contact with the shell. Furthermore, it will be noted that the element F is confined between the two faces 26 and 33 which diverge outwardly of the shell somewhat diagonally but with sufficient divergence to permit the element F being forced outwardly from between said faces 26 and 33 under the influence of the spring. Either or both methods of releasing may occur, dependent upon many variable factors entering into the operation of a friction gear. It will further be observed that, during the compression stroke, the converging shell friction surfaces will induce a certain amount of differential action, causing the two shoes C and D to aproach each other laterally. While, in actual practice, the shell taper will be made comparatively small, nevertheless such differential action as may occur will be readily acommodated on the two blunt angle faces 26 and 126, permitting the shoe C to advance slightly with respect to the element F. In other words, the cooperating faces 26 and 126, in addition to insuring release, also act as a safety factor in preventing bursting of the shell which might otherwise be induced because of the tapered shell friction surfaces.

Referring to the construction illustrated in Figure 6, the operation is substantially the same as that just described in connection with the other form of the invention except that there will be no appreciable amount of slippage or wedging action between the element E' and the shoe C' with which it directly engages, the effective wedging action being set up on the two faces 233 and 333. In release, it is obvious that the two elements E' and F' are free to fall away from the two shoe faces 226, the included angle between which is extremely blunt and of such character as to positively prevent sticking or jamming. In the arrangement of Figure 6, both sets of blunt faces 226 and 426; and 226 and 326, operate as safety factors in caring for such differential action as may be induced due to the converging character of the friction shell surfaces.

I have herein shown and described what I now consider the preferred manner of carrying out the invention, but the same is merely illustrative and I contemplate all changes and modifications that come within the scope of the claims appended hereto.

I claim:

1. In a friction shock absorbing mechanism, the combination with a friction shell; of a spring; of opposed friction shoes cooperable with the shell; and a multi-part wedge between the shoes, the parts having keen wedging angle engagement with each other, one of said parts having blunt releasing angle engagement with a shoe.

2. In a friction shock absorbing mechanism, the combination with a friction shell having inwardly converged friction surfaces; of a spring; a pair of opposed friction shoes each cooperable with the friction shell surface; and a two-part wedge between the shoes, said parts having keen angle wedging faces in engagement with each other, one of said parts and one shoe having blunt releasing angle engaging faces.

3. In a friction shock absorbing mechanism, the combination with a friction shell having inwardly converged friction surfaces; of a spring; a pair of opposed friction shoes each cooperable with a friction shell surface; and a two-part wedge between the shoes, said parts having keen angle wedging faces in engagement with each other, one of said parts and one shoe having blunt releasing angle engaging faces, said blunt angle and keen angle engaging faces being opposed transversely of the shell.

4. In a friction shock absorbing mechanism, the combination with a friction shell; of a spring; of opposed friction shoes cooperable with the shell; and a multi-part wedge between the shoes, the parts having keen wedging angle engagement with each other, one of said parts having blunt releasing angle engagement with a shoe, said wedge part having blunt angle engagement with a shoe being yieldingly resisted by said spring in its movements with respect to the shell.

5. In a friction shock absorbing mechanism, the combination with a friction shell having an interior pair of opposed longitudinally extending friction surfaces; of a pair of friction shoes cooperable with the surfaces of said shell; a spring; and a two-part wedge cooperable with said shoes, the two parts of the wedge having contacting faces extending at a relatively keen angle with respect to the axis of the shell, each part of the wedge having engagement with a shoe, at least one of the shoes and the wedge part cooperable therewith having engaging faces extending at a blunt releasing angle with respect to the axis of the mechanism.

6. In a friction shock absorbing mechanism, the combination with a friction shell; of a spring; a pair of opposed friction shoes cooperable with the shell; a pressure-receiving and transmitting wedge element having direct engagement with one of said shoes and provided with a keen angle wedge face; and a second wedge element having a keen angle wedge face cooperable with said wedge face of the first named element and provided also with a face cooperable with the other of said shoes, the last named engaging faces of the wedge element and shoe extending at a blunt releasing angle.

7. In a friction shock absorbing mechanism, the combination with a friction shell having interior inwardly converged friction surfaces; of a spring; a pair of opposed friction shoes cooperable with the shell surfaces; a spring follower interposed between the spring and the inner ends of said shoes;

and a multi-part wedge interposed between the shoes, the parts of said wedge having keen angle wedging engagement with each other and at least one of said parts having
5 blunt releasing angle engagement with a shoe.

In witness that I claim the foregoing I have hereunto subscribed my name this 5th day of October 1922.

JOHN F. O'CONNOR.

Witnesses:
UNA C. GRIGSBY,
H. M. WEAMER.